US009554274B1

(12) United States Patent
Castinado et al.

(10) Patent No.: US 9,554,274 B1
(45) Date of Patent: Jan. 24, 2017

(54) SYSTEM FOR AUTHENTICATION LEVELS ASSOCIATED WITH A WEARABLE DEVICE

(71) Applicant: BANK OF AMERICA CORPORATION, Charlotte, NC (US)

(72) Inventors: Joseph B. Castinado, North Glenn, CO (US); Phillip W. Mork, Huntersville, NC (US); Kimberly C. Turner, Sicklerville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/871,325

(22) Filed: Sep. 30, 2015

(51) Int. Cl.
| H04M 1/66 | (2006.01) |
| H04W 12/06 | (2009.01) |
| H04W 4/02 | (2009.01) |
| G06Q 20/32 | (2012.01) |
| G06Q 20/36 | (2012.01) |
| G06Q 20/40 | (2012.01) |
| G06Q 20/20 | (2012.01) |
| H04W 88/02 | (2009.01) |

(52) U.S. Cl.
CPC .......... *H04W 12/06* (2013.01); *G06Q 20/204* (2013.01); *G06Q 20/327* (2013.01); *G06Q 20/3227* (2013.01); *G06Q 20/3674* (2013.01); *G06Q 20/401* (2013.01); *H04W 4/023* (2013.01); *G06Q 2220/00* (2013.01); *H04W 88/02* (2013.01)

(58) Field of Classification Search
CPC .. G06Q 20/346; G06Q 20/347; G06Q 20/405; G06Q 20/10; G06Q 20/3278; G06Q 20/3572; G06Q 20/3227; G06Q 20/3674; G06Q 20/401; G06Q 20/327; G06Q 20/204; G06Q 2220/00; H04W 12/06; H04W 4/023; H04W 88/02
USPC ...... 455/411, 456.2, 414.1, 410; 705/44, 67, 705/64, 41, 39; 380/247, 250
See application file for complete search history.

(56) References Cited

U.S. PATENT DOCUMENTS

| 7,970,669 B1* | 6/2011 | Santos | G06Q 10/087 235/379 |
| 2012/0024947 A1* | 2/2012 | Naelon | G06Q 30/06 235/380 |
| 2012/0030043 A1* | 2/2012 | Ross | G06Q 20/20 705/16 |
| 2013/0159195 A1* | 6/2013 | Kirillin | G06Q 20/322 705/71 |
| 2015/0145656 A1* | 5/2015 | Levesque | G06F 1/163 340/407.1 |

(Continued)

*Primary Examiner* — Khai M Nguyen
(74) *Attorney, Agent, or Firm* — Michael A. Springs; Moore & Van Allen PLLC; W. Kevin Ransom

(57) ABSTRACT

Embodiments of the invention are directed to systems, methods, and computer program products for authentication levels associated with a wearable device. The system is configured to receive an indication that a user is in possession of the wearable device; authenticate the wearable device; receive an indication from the user to execute a transaction; determine that the user continues to remain in possession of the wearable device; determine that the transaction requires an authentication level higher than the default authentication level; receive additional authentication credentials associated with the authentication level required to execute the transaction; authenticate the wearable device using the additional authentication credentials received from the user; and execute the transaction associated with the authentication level higher than the default authentication level.

17 Claims, 6 Drawing Sheets

(56) References Cited

U.S. PATENT DOCUMENTS

| | | | | |
|---|---|---|---|---|
| 2015/0294303 A1* | 10/2015 | Hanson | ............... | G06Q 20/346 |
| | | | | 235/379 |
| 2015/0348006 A1* | 12/2015 | Taveau | ................... | G06Q 20/10 |
| | | | | 455/456.2 |
| 2016/0125677 A1* | 5/2016 | Williams | ................ | G06F 1/163 |
| | | | | 340/5.81 |
| 2016/0261409 A1* | 9/2016 | French | ...................... | H04L 9/00 |

* cited by examiner

US 9,554,274 B1

SYSTEM FOR AUTHENTICATION LEVELS ASSOCIATED WITH A WEARABLE DEVICE

BACKGROUND

Wearable devices, smart or otherwise, are becoming more prevalent in a variety of markets and industries. The use of wearable devices comes with a need for the security of personal information, an issue that concerns many people. As a result, several business industries, such as financial institutions, have taken precautionary measures to ensure the safety of personal information while ensuring convenience. This is typically accomplished by authenticating the wearable device and preauthorizing the wearable device to execute transactions.

SUMMARY

Embodiments of the present invention address the above needs and/or achieve other advantages by providing apparatuses (e.g., a system, computer program product, and/or other device) and methods for authentication levels associated with a wearable device. The present invention provides the functional benefit of authenticating the wearable device when the user initially adorns the wearable device and continues to monitor the wearable device to determine whether the user remains in continuous possession of the wearable device since its authentication. Further, when using the wearable device, the present invention enables the user to execute preset value purchases without providing additional authentication information at a point-of-sale terminal of the user. In this regard, the present invention implements a purchase program to enable the user to execute transactions with a set of preselected merchants using the authenticated wearable device without the need for additional authentication.

In one aspect, a system for authenticating the use of a wearable device to execute a transaction is presented. The system comprises one or more memory devices; one or more processing devices operatively coupled to the one or more memory devices; and computer instruction code stored in the one or more memory devices and structured to cause the one or more processing devices to: receive an indication that a user is in possession of the wearable device, the wearable device being associated with a token, wherein the token comprises information associated with one or more financial institution accounts of the user; determine a default authentication level associated with the wearable device; request one or more authentication credentials associated with the default authentication level; authenticate the wearable device at a first time based on at least the receiving one or more authentication credentials associated with the default authentication level; electronically receive an indication that the user is executing a transaction using the wearable device; determine that the transaction requires an authentication level higher than the default authentication level; determine one or more additional authentication credentials associated with the authentication level required to execute the transaction; and request the one or more additional authentication credentials from the user; authenticate the wearable device based on at least receiving the one or more additional authentication credentials associated with the authentication level higher than the default authentication level at a second time; execute the transaction using at least one of the one or more financial institution accounts of the user associated with the token based on at least determining that the user has continued to remain in possession of the wearable device from the second time and that the user has been authenticated at a level higher than the default authentication level to execute the transaction.

In some embodiments, the module is further configured to: electronically receive an indication that the user has not remained in possession of the wearable device from the second time; and revert the authentication level of the user from the authentication level higher than the default authentication level to the default authentication level.

In some embodiments, the module is further is configured to: electronically receive an indication that the user has scanned the wearable device at a point of sale of the merchant; retrieve the token associated with the wearable device based on at least receiving the indication that the user has scanned the wearable device at the point of sale of the merchant, wherein the token comprises user identification information; and complete execution of the transaction using at least one of the one or more financial institution accounts of the user associated with the token.

In some embodiments, the module is further configured to: electronically receive via the wearable device, an authentication request from the user to associate the wearable device with the one or more financial institution accounts of the user; electronically receive one or more authentication credentials from the user via the wearable device; and authenticate the wearable device based on at least verifying the authentication credentials received from the user.

In some embodiments, the module is further configured to: initiate presentation of one or more financial institution accounts associated with the user on the wearable device in response to receiving the authentication request; electronically receive, via the wearable device, a user selection of at least one of the one or more financial institution accounts; and establish a communicable link between the wearable device and the at least one financial institution account selected by the user, thereby enabling the user to execute transactions using funds associated with the financial institution account selected by the user.

In some embodiments, the module is further configured to: electronically receive via a mobile device of the user, an authentication request from the user to associate the wearable device with the one or more financial institution accounts of the user, wherein the mobile device is communicably paired with the wearable device; electronically receive one or more authentication credentials from the user via the mobile device; and authenticate the wearable device based on at least verifying the authentication credentials received from the user.

In some embodiments, the module is further configured to: initiate presentation of one or more financial institution accounts associated with the user on the mobile device of the user in response to receiving the authentication request; electronically receive, via the mobile device, a user selection of at least one of the one or more financial institution accounts; and establish a communicable link between the wearable device and the at least one financial institution account selected by the user, thereby enabling the user to execute transactions using funds associated with the financial institution account selected by the user.

In some embodiments, the module is further configured to: continuously monitor the wearable device to determine whether the user continues to remain in possession of the wearable device, wherein monitoring further comprises continuously receiving input from the wearable device, the input comprising biometric feedback associated with the wearable device.

In some embodiments, the module is further configured to: electronically receive one or more limits for the token for the execution of one or more transactions using the wearable device, wherein the one or more limits comprise at least a spending limit, a threshold on a number of transactions, a time limit, a merchant category, a product category, and/or a geographic location.

In another aspect, a computer program product for authenticating the use of a wearable device to execute a transaction associated with an authentication level is presented. The computer program product comprising a non-transitory computer-readable medium comprising code causing a first apparatus to: receive an indication that a user is in possession of the wearable device, the wearable device being associated with a token, wherein the token comprises information associated with one or more financial institution accounts of the user; determine a default authentication level associated with the wearable device; request one or more authentication credentials associated with the default authentication level; authenticate the wearable device at a first time based on at least the receiving one or more authentication credentials associated with the default authentication level; electronically receive an indication that the user is executing a transaction using the wearable device; determine that the transaction requires an authentication level higher than the default authentication level; determine one or more additional authentication credentials associated with the authentication level required to execute the transaction; request the one or more additional authentication credentials from the user; authenticate the wearable device based on at least receiving the one or more additional authentication credentials associated with the authentication level higher than the default authentication level at a second time; and execute the transaction using at least one of the one or more financial institution accounts of the user associated with the token based on at least determining that the user has continued to remain in possession of the wearable device from the second time and that the user has been authenticated at a level higher than the default authentication level to execute the transaction.

In yet another aspect, a computer implemented method for authenticating the use of a wearable device to execute a transaction is presented. The method comprising: receiving an indication that a user is in possession of the wearable device, the wearable device being associated with a token, wherein the token comprises information associated with one or more financial institution accounts of the user; determining a default authentication level associated with the wearable device; requesting one or more authentication credentials associated with the default authentication level; authenticating the wearable device at a first time based on at least the receiving one or more authentication credentials associated with the default authentication level; electronically receiving an indication that the user is executing a transaction using the wearable device; determining that the transaction requires an authentication level higher than the default authentication level; determining one or more additional authentication credentials associated with the authentication level required to execute the transaction; requesting the one or more additional authentication credentials from the user; authenticating the wearable device based on at least receiving the one or more additional authentication credentials associated with the authentication level higher than the default authentication level at a second time; and executing the transaction using at least one of the one or more financial institution accounts of the user associated with the token based on at least determining that the user has continued to remain in possession of the wearable device from the second time and that the user has been authenticated at a level higher than the default authentication level to execute the transaction.

BRIEF DESCRIPTION OF THE DRAWINGS

Figure 1:
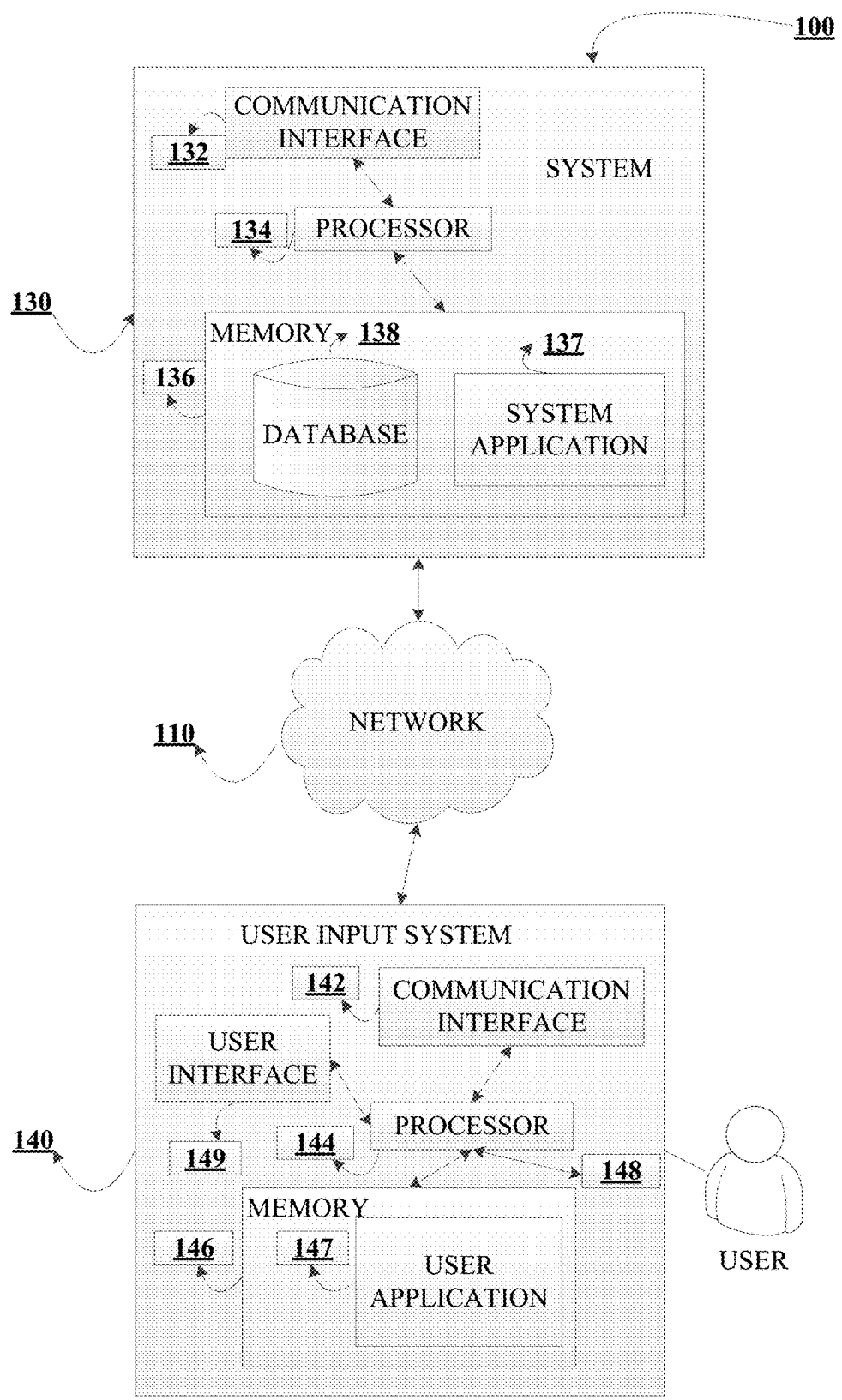
Figure 2:
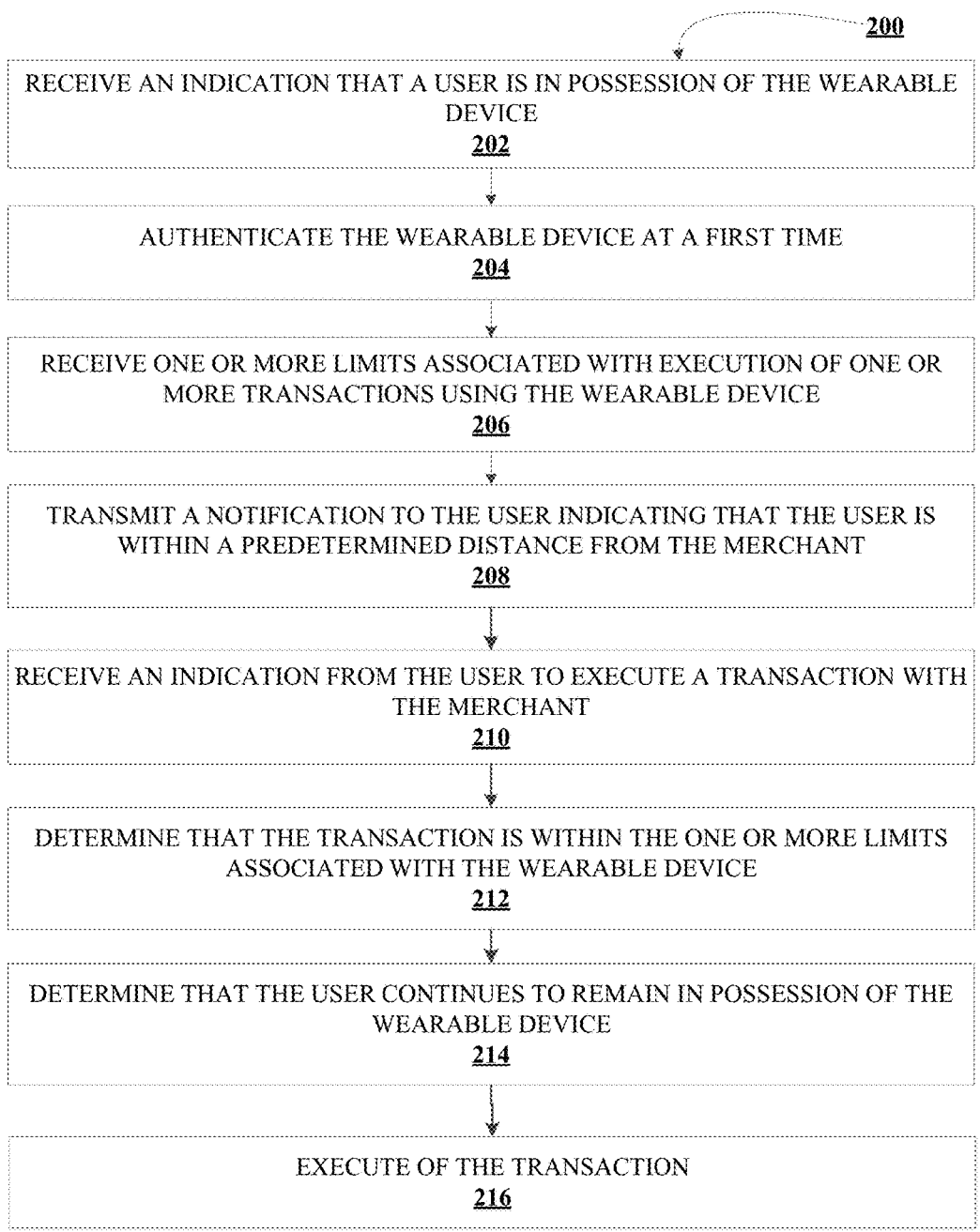
Figure 3:
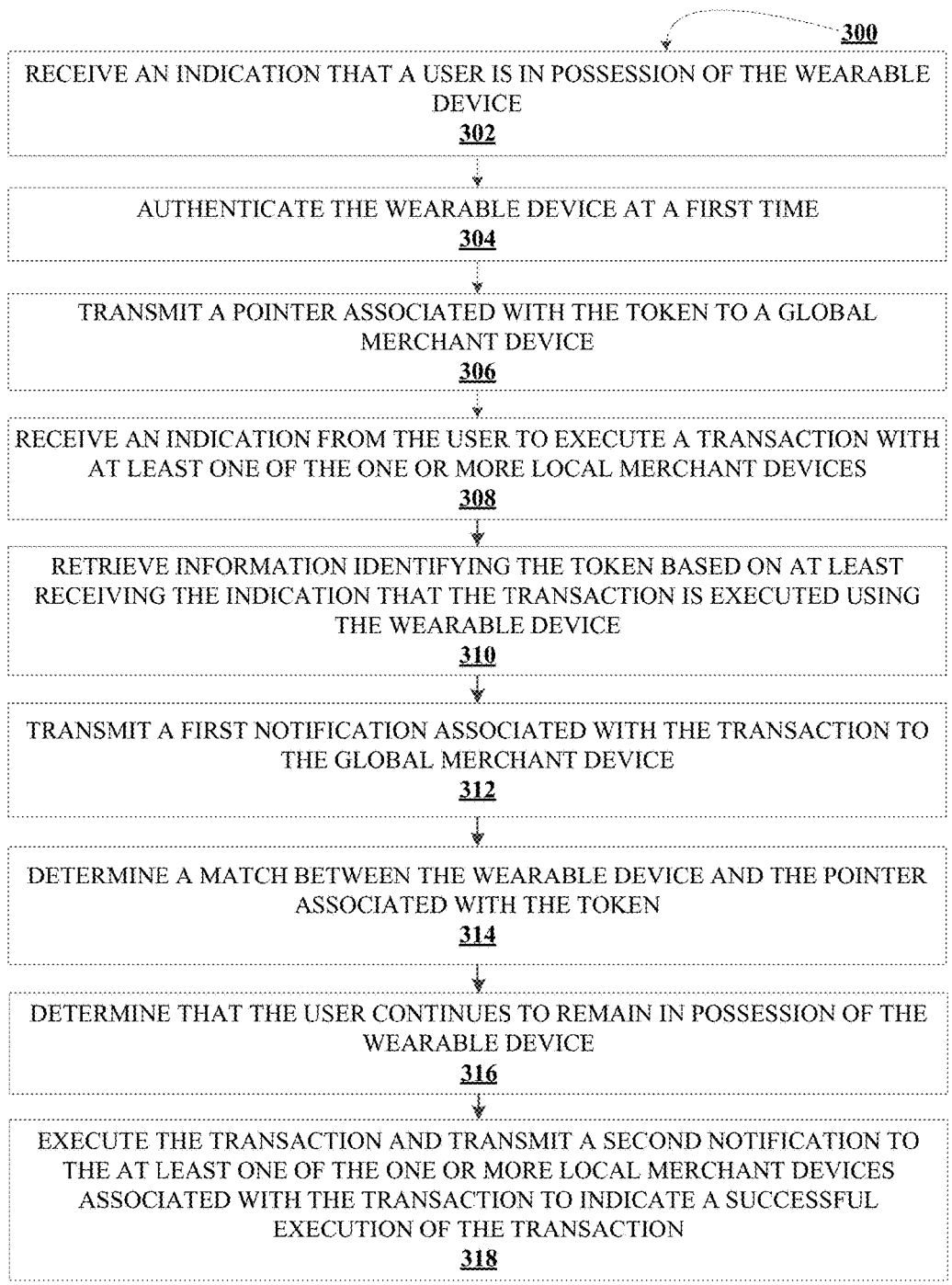
Figure 4:
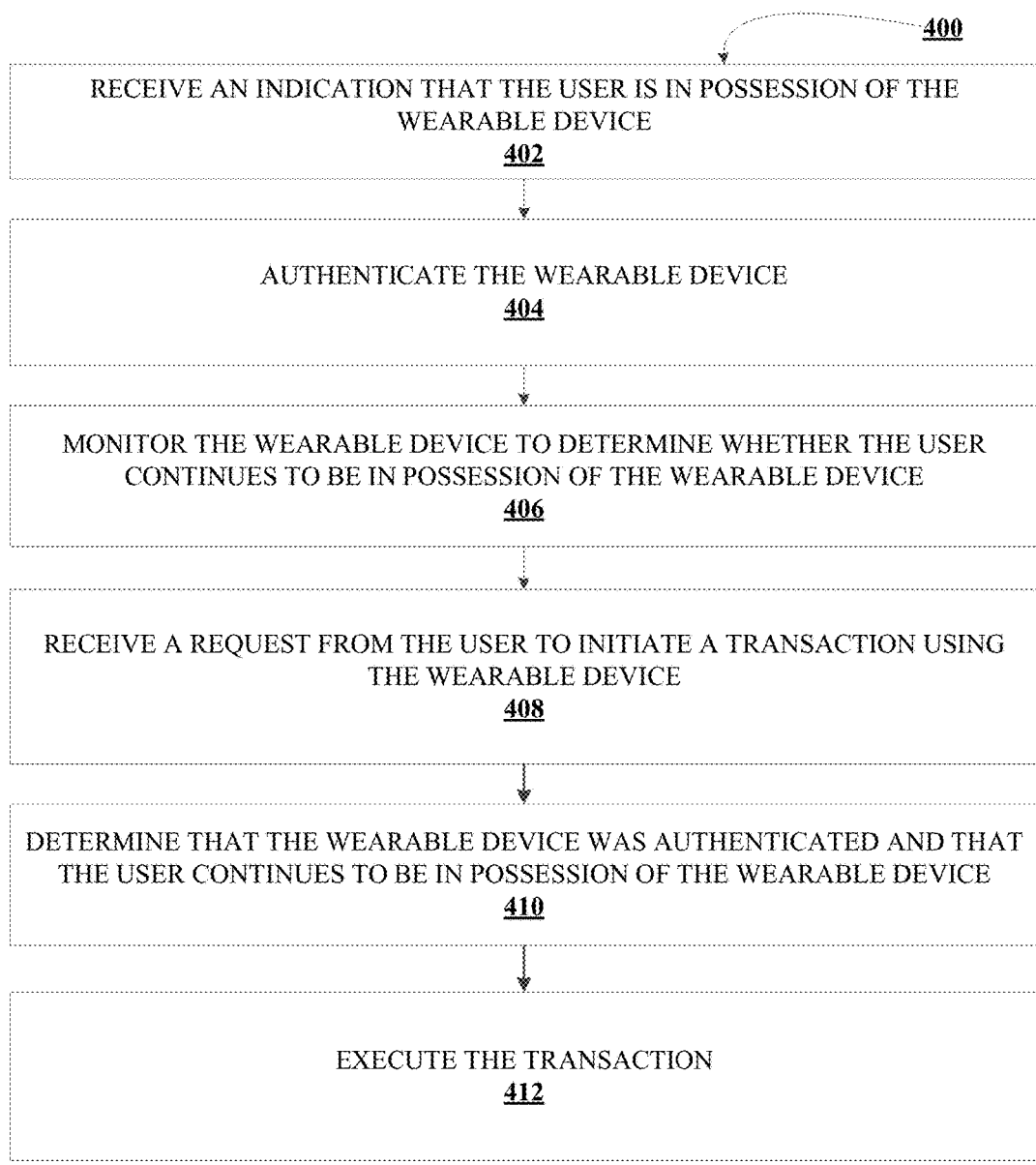
Figure 5:
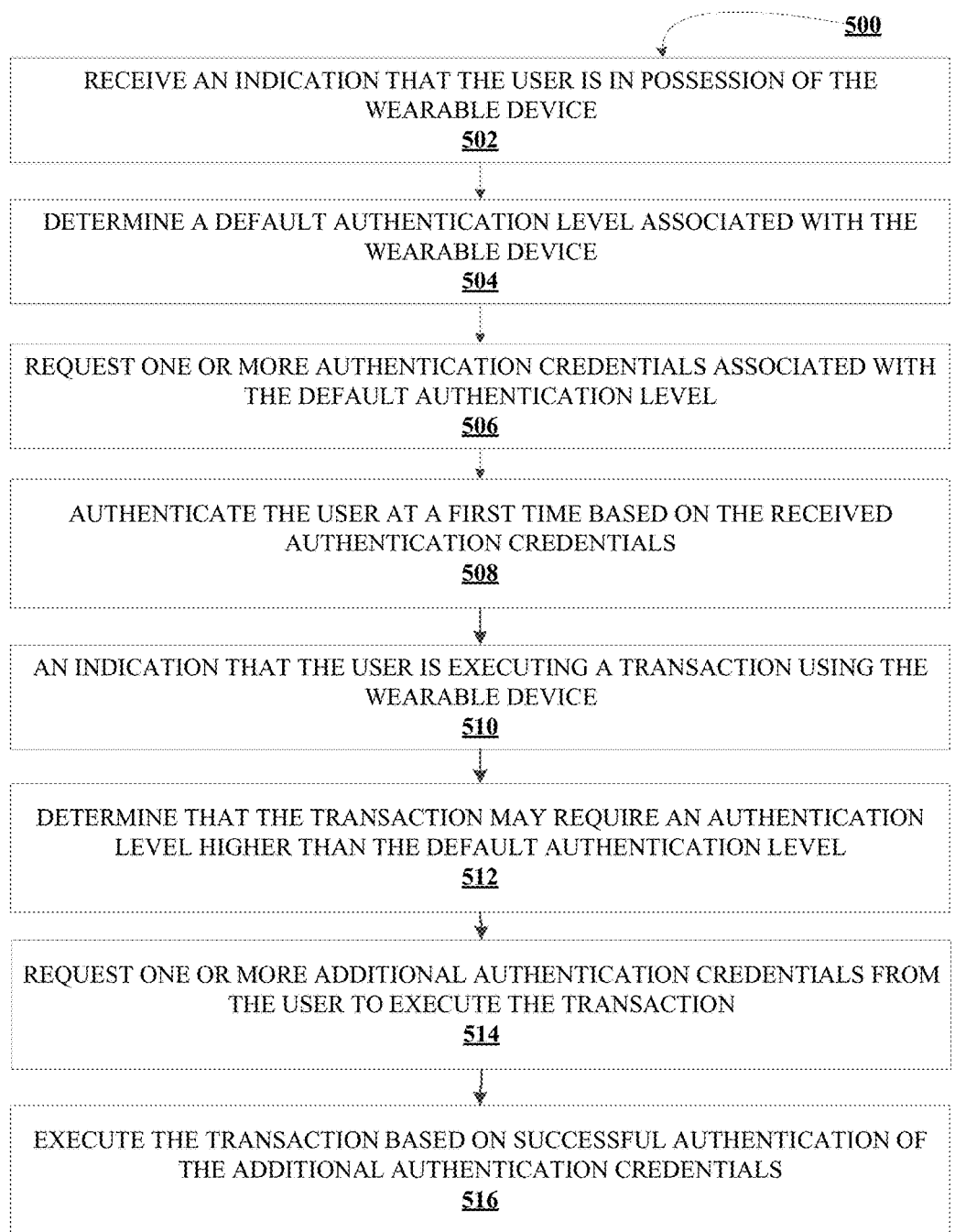
Figure 6:
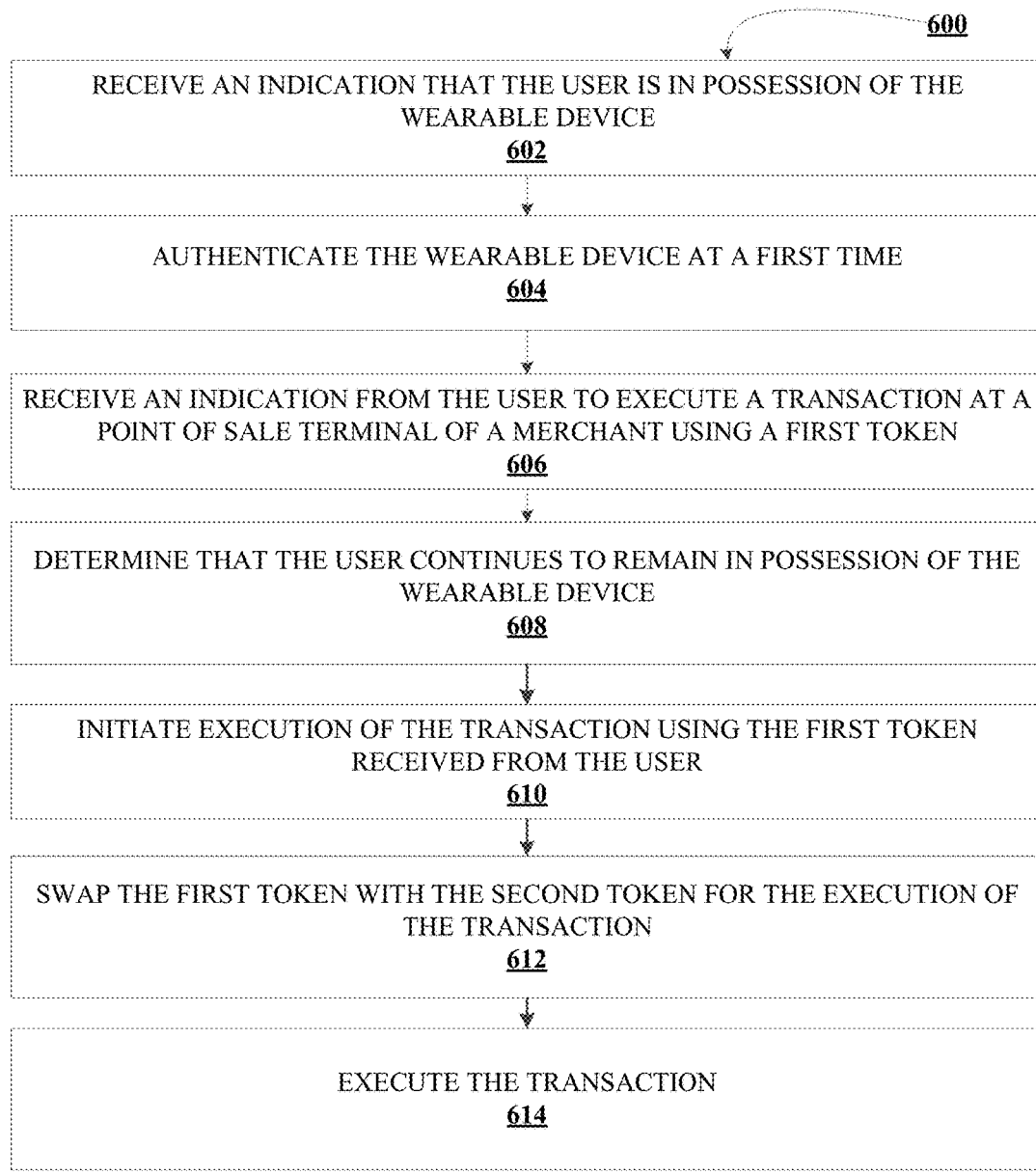

Having thus described embodiments of the invention in general terms, reference will now be made to the accompanying drawings, where:

FIG. 1 presents an exemplary block diagram of the system environment for implementing the process flows described herein in accordance with embodiments of the present invention;

FIG. 2 illustrates a high level process flow for authenticating the use of a wearable device to execute a transaction, in accordance with an embodiment of the invention;

FIG. 3 illustrates a high level process flow for authenticating the use of a wearable device for comprehensive access to a merchant location;

FIG. 4 illustrates a high level process flow for authenticating a wearable device, in accordance with an embodiment of the invention;

FIG. 5 illustrates a high level process flow for control of authentication levels associated with a wearable device, in accordance with an embodiment of the invention; and FIG. 6 illustrates high level process flow for tokenization and channel selection associated with wearable device transactions.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer).

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

Wearable devices, smart or otherwise, are becoming more prevalent in a variety of markets and industries. The devices are being used in many operations, such as but not limited to identifying a user, storage and transmission of credentials, storage and transmission of financial information, general user-data storage, and the like. In particular, wearable devices are used more and more to share user credentials and to perform financial transactions. The future of individual identification in consumer based industries will be led by the integration of wearable technology with authentication and identification in both physical and virtual environments.

FIG. 2 illustrates a high level process flow for authenticating the use of a wearable device to execute a transaction 200, in accordance with an embodiment of the invention. As shown in block 202, the process flow includes receiving an indication that the user is in possession of the wearable device. The indication may be based on initially detecting that the user has adorned the wearable device. Examples of potential wearable devices are smart watches, bands, earpods, jewelry, eyeglasses, contact lenses, clothing, and the like. In some embodiments, the wearable device may be associated with a token (e.g., an alias, substitute, surrogate, or other like identifier) as a replacement for sensitive account information. Typically, tokens or portions of tokens may be used as a stand in for a user account number, user name, pin number, routing information related to the financial institution associated with the account, security code, or other like information relating to the user account. The tokens may then be utilized as a payment instrument to complete a transaction.

In some embodiments, the tokens may be stored on the wearable device in a secure electronic chip 148 (see FIG. 1) with security features for controlling secure storage and access to the token. When the wearable device is used in a transaction, the token stored on the device may be used to enter into the transaction with the merchant. In other embodiments, the token may not be stored on the wearable device, but instead the token may be stored in the cloud of the provider of the wearable device (or another third party). When the user enters into a transaction with a merchant, transaction information is collected and provided to the owner of the cloud to determine the token, and thus, how the transaction should be processed.

Next, the process flow includes authenticating the wearable device at a first time, as shown in block 204 based on at least receiving the indication that the user is in possession of the wearable device. In this regard, the user may initiate an authentication request when initially adorning the wearable device via integrated communication modules associated with the wearable device that use Wi-Fi, near field communication (NFC), radio frequency identification (RFID), and other wireless technologies for communication. This may be done using a combination of various authentication credentials input directly into the wearable device or by pairing the wearable device with an auxiliary device (e.g., mobile device or the like) and authenticating the wearable device indirectly using the auxiliary device.

Once authenticated, the user may approach a point-of-sale terminal of a merchant and use the wearable device as a form of payment vehicle to execute the transaction. Since the wearable device has been pre-authenticated by the user and is determined to have remained in continual possession of the user since authentication, the user may be provided with the convenience of using the wearable device as a digital key (i.e. one touch operation) to execute the transaction without the need to provide additional identification information or authentication credentials at a point-of-sale terminal of a merchant. Further, this sense of security also transfers to the merchants who accept transactions using such a wearable device. The pre-authentication and possession monitoring of the wearable device provides the merchant with an increased level of confidence and thus reducing the likelihood of misrepresentation.

Next, the process flow includes receiving one or more limits associated with execution of one or more transactions using the wearable device, as shown in block 206. In some embodiments, the wearable device themselves, or the user accounts, individual users, tokens associated with the wearable device, or the like associated with the user, may have limitations that limit the transactions that the users may enter into using the wearable device. The limitations may include, limiting the transactions of the user to a single merchant, a group of multiple merchants, merchant categories, single products, a group a products, product categories, transaction amounts, transaction numbers, geographic locations, or other like limits. The limits may be placed on the wearable device by the user, or another entity (e.g., client, administrator, person, company, or the like) responsible for the transactions entered into by the user using the wearable device. The generation of the token may occur at the time of the transaction or well in advance of the transaction, as a one-time use token or multi-use token. In some embodiments, the one or more limits are associated with a purchase program. In this regard, the user may execute transactions with a set of preselected merchants using the authenticated wearable device without the need for additional authentication at the point of sale terminal.

In some embodiments, the system may be configured to determine the location of the user using a location determining device associated with the wearable device, such as Global Positioning System (GPS) location determining mechanisms or the like. In this way, the system may be configured to determine that the user is within a predetermined distance from a merchant (i.e., point of sale terminal of the merchant) associated with the purchase program. In response, the process flow includes transmitting a notification to the user indicating that the user is within a predetermined distance from the merchant, as shown in block 208. In one aspect, the notification may be presented to the user on the wearable device. In another aspect, the notification may be presented to the user on the auxiliary device paired to the wearable device. The notification may be a pop up message, an audible alert, a vibratory alert, or the like. In some embodiments, the notification may be appended with one or more offers for the user, the offers being associated with the merchants determined to be proximate to the user.

The user may then approach the point-of-sale of the merchant to execute a transaction. In this regard, the process flow includes receiving an indication from the user to execute a transaction with the merchant associated with the purchase program using the wearable device, as shown in block 210. A typical financial transaction executed by a user may require the user to present a payment vehicle (e.g., credit card, debit card, or the like) to the merchant to complete a transaction. During the process of executing the transaction, the merchant may require the user to provide additional authentication credentials to confirm the identity of the user. This may be in the form of a valid identification document, a signature, a personal identification number (PIN), or the like. Although this form of identification confirmation during the process of executing the transaction may provide a sense of trustworthiness to the merchant, it may result in unnecessary inconvenience to the user. With users performing a multitude of transactions using wearable devices in the financial industry, there is a need to ensure security and convenience. Although wearable devices may be used as a form of a payment vehicle at contactless point-of-sale terminals at merchant locations, the merchant may still have to confirm the identity of the user adorning the wearable device at every interaction to determine the trustworthiness of the user and reduce the likelihood of misrepresentation.

As described herein, the user may scan the wearable device at the point-of-sale of the merchant to execute a purchase. In this regard, the user may transmit a transaction request to the financial institution via the point of sale terminal of the merchant to initiate the execution of the purchase. The transaction request provided by the user may include, but not be limited to, the transaction type, the transaction amount, the transaction account, one or more related accounts, the transaction request date, and the like. In some other embodiments, the user may use the wearable device to execute other financial transactions such as, but not limited to, receiving statements related to an account history, processing automated teller machine (ATM) transactions, transferring funds from domestic or international accounts, process commercial payments related to online bill-pay, peer-to-peer payments, account withdrawals, account deposits, and/or the like. In some embodiments, in response to receiving an indication that the user has scanned the wearable device at a point of sale of the merchant, the system may be configured to retrieve the token associated with the wearable device to facilitate the execution of the transaction using token information associated with the token.

In response, the process flow then includes determining that the transaction is within the one or more limits associated with the wearable device based on at least the transaction information, as shown in block 212. In one aspect, the one or more limits assigned to the wearable device (or the token stored on the wearable device) may be part of the purchase program to enable the user to execute transactions with the merchant (also part of the purchase program) using the authenticated wearable device without the need for additional authentication. In some embodiments, the transaction information may assist in determining if the transaction meet or violate limits associated with the wearable device. If the transaction (e.g., transaction information) fails to meet a limit, the transaction may be denied. Alternatively, if the transaction (e.g., transaction information) meets a limit, then the transaction may be allowed.

Next, the process flow includes determining that the user continues to remain in possession of the wearable device based on at least continuously monitoring the wearable device from the first time, as shown in block 214. The wearable device may be monitored using biometric feedback received using physiologic tracking technology incorporated into the wearable device that can read, record, and store individual biometric traits such as heart rate, blood pressure, gait, or other types of physical activity to determine whether the wearable device has remained in continual possession of the user since authentication. In some embodiments, the biometric feedback received from the wearable device may be used to independently authenticate the identity of the user. In this regard, the biometric feedback may be used to cross-reference the authentication request received from the user to further authenticate the identity of the user.

Next, as shown in block 216, the process flow includes completing execution of the transaction based on at least determining that the transaction is within the one or more limits and that the user continues to remain in possession of the wearable device from the first time. In some embodiments, the system may determine that the user has not been in continual possession of the wearable device from the first time. In response, the system may request additional authentication credentials from the user to re-authenticate the user. In this way, going forward, the user may be allowed to conduct transactions using the wearable device as part of the purchase program if the system determines that the user has been in continual possession of the wearable device since its re-authentication.

FIG. 3 illustrates a high level process flow for authenticating the use of a wearable device for comprehensive access to a merchant location 300, in accordance to an embodiment of the invention. For purposes of the invention, a merchant location may refer to a predetermined geographic vicinity of the merchant. As shown in block 302, the process flow includes electronically receiving an indication that the user is in possession of the wearable device. In one aspect, the wearable device includes a token comprising information associated with one or more financial institution accounts of the user. Next, as shown in block 304, the process flow includes authenticating the wearable device at a first time based on at least receiving the indication that the user is in possession of the wearable device. In response, the process flow includes transmitting a pointer associated with the token to a global merchant device, as shown in block 306. Typically, a pointer may refer to a location in memory and configured to hold the address of the token for improved performance for repetitive operations. In one aspect, the global merchant device may store one or more pointers for one or more tokens received from one or more users in a memory location.

For purposes of the invention, a global merchant may be a business, a person that is selling a good or service, or any other institution or individual managing one or more local merchants. In some embodiments, the global merchant may be involved in a store-within-a-store agreement with a plurality of local merchants to enable the local merchants to rent a part of the global merchant's geographic space and operate within the geographic space of the global merchant. In one aspect, the local merchants may operate independently of the global merchant. For example, a bookstore may partner with a coffee shop because customers often desire a place to sit and enjoy a drink while they browse. In this instance, the coffee shop and the bookstore operate independently of each other. In another aspect, the operations of the local merchants may be dependent/semi-dependent on the global merchant. For example, an amusement park may host a plurality of restaurants and galleries of games whose operations may be dependent/semi-dependent on the amusement park. In some other embodiments, the geographic space associated with the global merchant may include a number of secure access spaces that may require the user to provide additional credentials and/or payment for access. In this regard, the transaction may include the user utilizing the wearable device to gain access to a secure area within the geographic vicinity associated with the global merchant.

In some embodiments, the global merchant device may be a point-of-sale terminal associated with the global merchant. In one aspect, the global merchant device may be operatively and selectively connected to one or more local merchant devices by establishing a communicable link between the global merchant device and the plurality of local merchant devices via a wired or wireless communication channel. In some embodiments, the plurality of local merchants are physically located and operate within a predetermined geographic radius associated with the global merchant.

Next, as shown in block 308, the process flow includes receiving an indication from the user to execute a transaction with at least one of the one or more local merchant devices. In this regard, the user may initiate the execution of the transaction using a wearable device. The user may approach any one or more local merchant devices and scan the wearable device to initiate a transaction. In response, the process flow includes retrieving information identifying the token associated with the wearable device based on at least receiving the indication that the transaction is executed using the wearable device, as shown in block 310. In this regard, the system may be configured to retrieve the token associated with the wearable device at the local merchant device. In some embodiments, the information identifying the token may include information identifying the wearable device associated with the token, information associated with the user adorning the wearable device, and/or authentication information associated with the wearable device.

In response, the process flow includes electronically transmitting a first notification associated with the transaction to the global merchant device, as shown in block 312. In some embodiments, the first notification includes an indication that the transaction is being executed at one of the local merchant devices using the wearable device. In some other embodiments, the first notification includes an indication that the user is attempting to gain access to a secure area within the geographic vicinity of the global merchant. The first notification may include at least a portion of the token and/or the information identifying the token.

In response, the process flow includes determining a match between the wearable device and the pointer associated with the token, as shown in block 314 based on at least the information identifying the token associated with the wearable device. In this regard, the system may be configured to compare the information identifying the token with the one or more pointers for the one or more tokens received from the one or more users to determine a match. In this way, the system may be configured to identify the identity of the user and determine a source of payment to be applied towards the execution of the transaction.

Next, as shown in block 316, the process flow includes determining that the user continues to remain in possession of the wearable device based on at least continuously monitoring the wearable device from the first time. The wearable device may be monitored using biometric feedback received using physiologic tracking technology incorporated into the wearable device that can read, record, and store individual biometric traits such as heart rate, blood pressure, gait, or other types of physical activity to determine whether the wearable device has remained in continual possession of the user since authentication. In response, the process flow includes executing the transaction using at least one of the one or more financial institution accounts of the user associated with the token, as shown in block 318. In this regard, while the transaction is initiated by the user at any of the local merchant devices, the execution of the transaction occurs at the global merchant device. This may be achieved by transmitting information (token information, user information, transaction information, or the like) via the established communication channel between the local merchant devices and the global merchant device. In response to executing the transaction, the process flow includes electronically transmitting a second notification to the local merchant associated with the transaction to indicate a successful execution of the transaction at the global merchant device.

The present invention provides the functional benefit of allowing the user and the wearable device to be pre-authenticated when initially adorned by the user such that the user may not be required to provide additional identification information or authentication credentials at a point-of-sale terminal of a merchant. In this regard, FIG. 3 illustrates a process flow for authenticating a wearable device 400, in accordance with an embodiment of the invention. As shown in block 402, the process flow includes receiving an indication that the user is in possession of the wearable device. Typically, the wearable device comprises one or more sensors configured to gather physiological and/or movement data to enable monitoring and possession of the wearable device by the user. The data gathered using the wearable device may be transmitted either to an auxiliary device (e.g. personal computing device, mobile device, or the like) or to an online storage site. The variety of sensors may be attributed to the types of stimuli that they correspond to (e.g., physiological vital signs, temperature, body movements, organic substances, or the like) and their placements (clothing, body part accessory, subcutaneous implant, or the like). In this way, the system may be configured to determine whether the user is in possession of the wearable device.

Next, as shown in block 404, process flow includes authenticating the wearable device. Typically, authenticating a wearable device may comprise sending an authentication request to the financial institution to associate (e.g., enroll) the wearable device with the user's online banking account. In this regard, the system may be configured to receive an authentication request from the user. The authentication request may be submitted by the user using the wearable device directly, or an auxiliary device previously paired to the wearable device. In one aspect, the wearable device may be securely paired with an auxiliary device by establishing a secure channel between the two unassociated devices over a short range wireless communication channel. In this way, a secure communicable link is created between the wearable device and the auxiliary device utilizing system application directives.

The authentication request includes device information associated with the wearable device and/or the auxiliary device paired with the wearable device and user information associated with the user and user's online banking account. The device information associated with the wearable device and/or the auxiliary device paired with the wearable device may be any information sufficient to generate a device "fingerprint", or a unique signature of the user's wearable device and/or the auxiliary device paired with the wearable device. The user information may be any information sufficient to identify the user and the user's online banking account. In some embodiments, the user information may include, but is not limited to, at least one of a username, contact information, a password, a PIN number, biometric information (e.g., physiological features such as fingerprints, finger vein and palm vein patterns, as well as iris and facial recognition to verify individual identities), a unique identification number associated with the user, social network information, an account number, or a card number. In some embodiments, the user information may be proprietary to the financial institution, such as an account number, a reference number to an account, a client number, or the like. In other embodiments, the user information may be public information, such as a phone number, mailing address, email address, or the like.

In some other embodiments, the wearable device may be paired with an auxiliary device associated with the user. In these instances, the system may be configured to receive the authentication request from the user via an application or via a banking website downloadable on the auxiliary device. In this regard, the system may be configured to receive one or more authentication credentials from the user via the auxiliary device and authenticate the user based on the received authentication credentials. In response to successfully authenticating the user and the auxiliary device, the system may automatically authenticate the wearable device paired or communicably linked to the auxiliary device. In response to successfully authenticating the user, the user may be authorized to access the online banking account using the wearable device to execute one or more transactions.

Next, as shown in block 406, the process flow includes monitoring the wearable device to determine whether the user continues to remain in possession of the wearable device. In this regard, the system may be configured to monitor the variety of sensors associated with the wearable device and the stimuli that they correspond to (e.g., physiological vital signs, temperature, body movements, organic substances, or the like). In some embodiments, the sensors may be monitored periodically to determine possession. In instances where the wearable device is paired with an auxiliary device, the system may be configured to monitor the auxiliary device and determine whether the mobile device continues to be paired to the wearable device. In this regard, the wearable device may be monitored based on at least determining a location of the auxiliary device paired to the wearable device using global positioning data, such as accessing auxiliary device global positioning systems (GPS) or the like. Global positioning data may include any information collected from methods, systems, apparatus, computer programs, or the like involving locating a position of the user's auxiliary device relative to satellites, fixed locations, beacons, transmitters or the like. In some instances, global positioning data may be collected from a GPS device, such as a navigation system. Such a navigation system may be, but is not limited to, hardware and/or software that is part of the auxiliary device. In response to determining the location of the auxiliary device and that the auxiliary device is still paired with the wearable device, the system may be configured to determine that the user continues to remain in possession of the wearable device. In some embodiments, both the auxiliary device and the wearable device may be concurrently monitored to determine that the user continues to remain in possession of the wearable device.

Next, as shown in block 408, the process flow includes receiving a request from the user to initiate a transaction using the wearable device. In some embodiments, the user may use the wearable device at a point-of-sale terminal of a merchant to execute a transaction. In this regard, the user may transmit an indication to execute a transaction using the wearable device.

Next, as shown in block 410, the process flow includes determining that the wearable device was authenticated and that the user continues to remain in possession of the wearable device. In some embodiments, the wearable device may only have to be authenticated once at a first time stamp. The wearable device may then be continuously monitored to determine whether the user continues to remain in possession of the wearable device from the first time stamp when the wearable device is authenticated until a second time stamp when receiving the request to initiate a transaction. In instances where the wearable device is paired with an auxiliary device, the system may determine the location of the auxiliary device and then determine whether the auxiliary device continues to remain paired with the wearable device. In response, the process flow includes executing the transaction, as shown in block 412.

Typically, numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password. Accordingly, a continuum of authentication may be used to quantify (or dictate) the levels of authentication. Likewise, a continuum of transactions permitted may be used to quantify (or dictate) the number or context in which transactions are permitted at a certain point on the continuum. In this regard, the continuum of transactions may depend on one or more limits assigned to either a payment credential, i.e., a token associated with the wearable device or the wearable device itself used in the execution of a transaction in the continuum.

In some embodiments, a "hard authentication" requires full authentication credentials. This means that it requires the strictest combination of credentials, thereby indicating that all transactions are permitted regardless of the limits imposed on either the payment credential, i.e., a token associated with the wearable device or the wearable device itself used in the execution of a transaction. In between the two extremes, "a soft authentication" requires minimal credentials, moderate credentials or most credentials for various points along the continuum, thereby indicating that moderate transactions are permitted and most transactions are permitted depending on the one or more limits imposed on either the payment credential, i.e., a token associated with the wearable device or the wearable device itself used in the execution of a transaction. The continuum generally represents the number of credentials required and/or the relative strength of the credentials required for that point on the continuum.

FIG. 5 illustrates a high level process flow for control of authentication levels associated with a wearable device 500, in accordance with an embodiment of the invention. As shown in block 502, the process flow includes receiving an indication that the user is in possession of the wearable device. The indication may be based on initially detecting that the user has adorned the wearable device. In some embodiments, the wearable device may be associated with a token (e.g., an alias, substitute, surrogate, or other like identifier) as a replacement for sensitive account information. Typically, tokens or portions of tokens may be used as a stand in for a user account number, user name, pin number, routing information related to the financial institution associated with the account, security code, or other like information relating to the user account. The tokens may then be utilized as a payment instrument to complete a transaction.

In response, the process flow includes determining a default authentication level associated with the wearable device, as shown in block 504. In some embodiments, the default authentication level may be any authentication level in the authentication continuum, including, but not limited to a hard authentication level, a soft authentication level, and a zero authentication level. In one aspect, the system may be configured to enable the user to assign the default authentication level to the wearable device. In another aspect, the default authentication level may be automatically assigned to the wearable device. In yet another aspect, the default authentication level may be assigned to the wearable device by the merchant. In some embodiments, the default authentication level may correlate to a specific set of limits imposed on either the payment credential, i.e., a token associated with the wearable device or the wearable device itself.

In response to determining the default authentication level, the process flow includes requesting one or more authentication credentials associated with the default authentication level, as shown in block 506. In this regard, the authentication credentials may be received from the user via the wearable device and/or the auxiliary device communicably linked to the wearable device. In response, the system may be configured to authenticate the user at a first time based on the received authentication credentials, as shown in block 508. In response to successfully authenticating the user, the system may automatically authenticate the wearable device paired or communicably linked to the auxiliary device and/or the auxiliary device itself.

Next as shown in block 510, the process flow includes electronically receiving an indication that the user is executing a transaction using the wearable device. In this regard, the transaction may be associated with an authentication level. The system may determine whether the default authentication level associated with the wearable device is sufficient to execute the transaction. In this regard, the authentication level associated with the transaction may be compared to the default authentication level associated with the wearable device. In some embodiments, the system may determine that the transaction may require an authentication level higher than the default authentication level, as shown in block 512. In doing so, the system may request one or more additional authentication credentials from the user to execute the transaction, as shown in block 514. In response, the system may be configured to successfully authenticate the one or more additional authentication credentials at a second time to increase the authentication level associated with the user, the wearable device, and/or the auxiliary device linked to the wearable device. In this regard, increasing the authentication level of the wearable device may correspond to relaxing the constraints imposed by the one or more limits as preferred by either the user, the financial institution, and/or the merchant. In some embodiments, increasing the authentication level of the wearable device may correspond to applying a second set of limits to either the payment credential, i.e., a token associated with the wearable device or the wearable device itself as predetermined by the user, the financial institution, and/or the merchant. In one aspect, a successful validation may include determining a successful match between the one or more additional authentication credentials received from the user and the authentication credentials stored in a database.

In response to successfully authenticating the one or more additional authentication credentials, the process flow includes executing the transaction using at least one of the one or more financial institution accounts of the user associated with the token based on at least determining that the user has continued to remain in possession of the wearable device from the second time and that the user has been authenticated at a level higher than the default authentication level to execute the transaction, as shown in block 516. As described herein, the wearable device may be monitored using biometric feedback received using physiologic tracking technology incorporated into the wearable device that can read, record, and store individual biometric traits such as heart rate, blood pressure, gait, or other types of physical activity to determine whether the wearable device has remained in continual possession of the user since authentication.

In some embodiments, the system may be configured to electronically receive an indication that the user has not remained in possession of the wearable device from the second time. The user may have temporarily removed the wearable device since the second time that the wearable device was authenticated. In doing so, the wearable device may cease to transmit biometric information for a particular period of time. In some embodiments, the system may determine that the user is no longer in possession of the wearable device based on the period of time that the wearable device ceases to transmit biometric information. In one aspect, the period of time may be preset by the user. In another aspect, the period of time may be set by the merchant. In yet another aspect, the period of time may be set by financial institution.

In response to determining that the user is no longer in possession of the user, the system may be configured to revert the authentication level of the user from the authentication level higher than the default authentication level to the default authentication level. In this case, if the user then attempts to execute the transaction, the system may be configured to request additional authentication credentials from the user. In response to successful validation of the one or more additional authentication credentials, the authentication level of the user may be elevated to an authentication level higher than the default authentication level, thereby enabling the user to execute the transaction. In some embodiments, the system may revert to the default authentication level based on the period of time that the wearable device ceases to transmit biometric information.

FIG. 6 illustrates a process flow for tokenization and channel selection associated with wearable device transactions 600, in accordance with an embodiment of the invention. As shown in block 602, the process flow includes receiving an indication that the user is in possession of the wearable device. The indication may be based on initially detecting that the user has adorned the wearable device. In some embodiments, the wearable device may be associated with a multitude of tokens (e.g., an alias, substitute, surrogate, or other like identifier) as a replacement for sensitive account information. Typically, tokens or portions of tokens may be used as a stand in for a user account number, user name, pin number, routing information related to the financial institution associated with the account, security code, or other like information relating to the user account. The one or more tokens may then be utilized as payment instruments comprising information associated with one or more financial institution accounts of the user to complete a transaction. In some embodiments, the one or more tokens may be stored locally on the wearable device and/or the auxiliary device operatively linked to the wearable device. In some other embodiments, the one or more tokens may be stored in a database (e.g., physical storage or cloud storage) associated with the financial institution. In yet another embodiment, the one or more tokens may be stored in a third party database.

Next, the process flow includes authenticating the user at a first time based on at least receiving the indication that the user is in possession of the user, as shown in block 604. In response to successfully authenticating the user, the system may automatically authenticate the wearable device paired or communicably linked to the auxiliary device and/or the auxiliary device itself. In response, the process flow includes electronically receiving an indication from the user to execute a transaction at a point of sale terminal of a merchant using a first token from the one or more tokens associated with the wearable device, as shown in block 606. In some embodiments, the one or more tokens may be assigned one or more limits for the execution of one or more transactions using the wearable device. In this regard, the one or more limits comprise at least a spending limit, a threshold on a number of transactions, a time limit, a merchant category, a product category, and/or a geographic location.

Next, the process flow includes determining that the user continues to remain in possession of the wearable device, as shown in block 608. As described herein, the wearable device may be monitored using biometric feedback received using physiologic tracking technology incorporated into the wearable device that can read, record, and store individual biometric traits such as heart rate, blood pressure, gait, or other types of physical activity to determine whether the wearable device has remained in continual possession of the user since authentication.

In some embodiments, the user may initiate the execution of a transaction at a point of sale terminal by scanning the wearable device at the point of sale terminal of the merchant. In this regard, the system may be configured to receive information associated with the transaction from the point of sale terminal of the merchant. In one aspect, the information associated with the transaction may include but is not limited to a product name, a merchant name, a merchant location, a product-level amount, an aggregate amount, information associated with the token used, and/or the like. In response, the system may initiate a presentation of an interface on the wearable device. The interface may include one or more available tokens for the user to be applied towards the transaction. In one aspect, the system may present the one or more available tokens based on pre-configured preferences. In this regard, the user may select one or more preferences assigning specific tokens to be used for transactions based on the transaction information. For example, the user may assign preferences to use specific tokens based on the geographic location from where the transaction is being initiated. In another example, the user may assign preferences to use specific tokens based on a transaction amount. In some other embodiments, the system may present the one or more available tokens automatically based on default preferences. In response, the system may enable the user to select at least one token from the one or more available tokens presented on the interface. The system may then retrieve the selected token and initiate execution of the transaction using at least one of the one or more financial institution accounts of the user associated with the selected token, as shown in block 610.

In some embodiments, the system may be configured to enable the user to set up a contingency token for the first token indicating that the contingency token may be used as a backup in case the one or more limits of the first token is violated when the user executes the transaction. For example, a parent may assign a slave token to a child with specific limits for use. In addition, the parent may assign a master token that may be used to complete execution of any transaction initiated by the child using the slave token, if the limits associated with the slave token are violated when used in the execution of the transaction. In some embodiments, the system may be configured to provide a notification to the parent indicating that one or more limits of the slave token has been violated. In one aspect, the system may be configured to present one or more tokens associated with the parent to receive an indication of which of the one or more master tokens the parent would like to use as a backup for the slave token. The parent may then choose a token to be used to complete the execution of the transaction initiated by the child.

Accordingly, the system may be configured to determine a second token from the one or more tokens based on at least the transaction information and the one or more limits associated with the second token. In response, the process flow includes swapping the first token with the second token for the execution of the transaction, as shown in block 612. In this regard, the system may either swap the first token with the second token by retrieving the second token stored locally on the wearable device of the user or establish a communication link with one or more databases associated with the financial institution and/or a third party to retrieve the second token. In response to swapping the first token with the second token, the process flow includes executing the transaction using at least one of the one or more financial institution accounts of the user associated with the second token, as shown in block 614.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/842,303 | AUTHENTICATION SYSTEM USING WEARABLE PRESENCE TO MAINTAIN ACCOUNT AUTHENTICATION | |
| 14/842,310 | USE OF WEARABLE AS AN ACCOUNT CONTROL SYSTEM | |
| 14/842,787 | A SYSTEM FOR AUTHENTICATING A WEARABLE DEVICE FOR TRANSACTION QUEUING | |
| 14/842,781 | A SYSTEM FOR AUTHENTICATING THE USE OF A WEARABLE DEVICE TO EXECUTE A TRANSACTION | |
| 14/842,791 | A SYSTEM FOR AUTHENTICATING A MOBILE DEVICE FOR COMPREHENSIVE ACCESS TO A FACILITY | |
| | A SYSTEM FOR TOKENIZATION AND TOKEN SELECTION ASSOCIATED WITH WEARABLE DEVICE TRANSACTIONS | Concurrently Herewith |

What is claimed is:

1. A system for authenticating the use of a wearable device to execute a transaction associated with an authentication level, the system comprising:
one or more memory devices;
one or more processing devices operatively coupled to the one or more memory devices; and
computer instruction code stored in the one or more memory devices and structured to cause the one or more processing devices to:
receive an indication that a user is in possession of the wearable device, the wearable device being associated with a token, wherein the token comprises information associated with one or more financial institution accounts of the user;
determine a default authentication level associated with the wearable device;
request one or more authentication credentials associated with the default authentication level;
authenticate the wearable device at a first time based on at least the receiving one or more authentication credentials associated with the default authentication level;
electronically receive an indication that the user is executing a transaction using the wearable device;
determine that the transaction requires an authentication level higher than the default authentication level;
determine one or more additional authentication credentials associated with the authentication level required to execute the transaction;
request the one or more additional authentication credentials from the user;
authenticate the wearable device based on at least receiving the one or more additional authentication credentials associated with the authentication level higher than the default authentication level at a second time;
execute the transaction using at least one of the one or more financial institution accounts of the user associated with the token based on at least determining that the user has continued to maintain possession of the wearable device from the first time to the second time and that the user has been authenticated at a level higher than the default authentication level to execute the transaction;

electronically receive an indication that the user has not maintained possession of the wearable device for a predetermined period of time after the execution of the transaction; and revert the authentication level of the user from the authentication level higher than the default authentication level to the default authentication level.

2. The system of claim 1, wherein the module is further is configured to:

electronically receive an indication that the user has scanned the wearable device at a point of sale of the merchant;

retrieve the token associated with the wearable device based on at least receiving the indication that the user has scanned the wearable device at the point of sale of the merchant, wherein the token comprises user identification information; and complete execution of the transaction using at least one of the one or more financial institution accounts of the user associated with the token.

3. The system of claim 1, wherein the module is further configured to:

electronically receive via the wearable device, an authentication request from the user to associate the wearable device with the one or more financial institution accounts of the user;

electronically receive one or more authentication credentials from the user via the wearable device; and authenticate the wearable device based on at least verifying the authentication credentials received from the user.

4. The system of claim 3, wherein the module is further configured to:

initiate presentation of one or more financial institution accounts associated with the user on the wearable device in response to receiving the authentication request;

electronically receive, via the wearable device, a user selection of at least one of the one or more financial institution accounts; and establish a communicable link between the wearable device and the at least one financial institution account selected by the user, thereby enabling the user to execute transactions using funds associated with the financial institution account selected by the user.

5. The system of claim 1, wherein the module is further configured to:

electronically receive via a mobile device of the user, an authentication request from the user to associate the wearable device with the one or more financial institution accounts of the user, wherein the mobile device is communicably paired with the wearable device;

electronically receive one or more authentication credentials from the user via the mobile device; and authenticate the wearable device based on at least verifying the authentication credentials received from the user.

6. The system of claim 5, wherein the module is further configured to:

initiate presentation of one or more financial institution accounts associated with the user on the mobile device of the user in response to receiving the authentication request;

electronically receive, via the mobile device, a user selection of at least one of the one or more financial institution accounts; and establish a communicable link between the wearable device and the at least one financial institution account selected by the user, thereby enabling the user to execute transactions using funds associated with the financial institution account selected by the user.

7. The system of claim 1, wherein the module is further configured to:

continuously monitor the wearable device to determine whether the user continues to remain in possession of the wearable device, wherein monitoring further comprises continuously receiving input from the wearable device, the input comprising biometric feedback associated with the wearable device.

8. The system of claim 1, wherein the module is further configured to:

electronically receive one or more limits for the token for the execution of one or more transactions using the wearable device, wherein the one or more limits comprise at least a spending limit, a threshold on a number of transactions, a time limit, a merchant category, a product category, and/or a geographic location.

9. A computer program product for authenticating the use of a wearable device to execute a transaction associated with an authentication level, the computer program product comprising a non-transitory computer-readable medium comprising code causing a first apparatus to:

receive an indication that a user is in possession of the wearable device, the wearable device being associated with a token, wherein the token comprises information associated with one or more financial institution accounts of the user;

determine a default authentication level associated with the wearable device;

request one or more authentication credentials associated with the default authentication level;

authenticate the wearable device at a first time based on at least the receiving one or more authentication credentials associated with the default authentication level;

electronically receive an indication that the user is executing a transaction using the wearable device;

determine that the transaction requires an authentication level higher than the default authentication level;

determine one or more additional authentication credentials associated with the authentication level required to execute the transaction;

request the one or more additional authentication credentials from the user;

authenticate the wearable device based on at least receiving the one or more additional authentication credentials associated with the authentication level higher than the default authentication level at a second time;

execute the transaction using at least one of the one or more financial institution accounts of the user associated with the token based on at least determining that the user has continued to remain in possession of the wearable device from the second time and that the user has been authenticated at a level higher than the default authentication level to execute the transaction;

electronically receive an indication that the user has not maintained possession of the wearable device for a predetermined period of time after the execution of the transaction; and revert the authentication level of the user from the authentication level higher than the default authentication level to the default authentication level.

10. The computer program product of claim 9, wherein the first apparatus is further configured to:
   electronically receive an indication that the user has scanned the wearable device at a point of sale of the merchant;
   retrieve the token associated with the wearable device based on at least receiving the indication that the user has scanned the wearable device at the point of sale of the merchant, wherein the token comprises user identification information; and
   complete execution of the transaction using at least one of the one or more financial institution accounts of the user associated with the token.

11. The computer program product of claim 9, wherein the first apparatus is further configured to:
   electronically receive via the wearable device, an authentication request from the user to associate the wearable device with the one or more financial institution accounts of the user;
   electronically receive one or more authentication credentials from the user via the wearable device; and
   authenticate the wearable device based on at least verifying the authentication credentials received from the user.

12. The computer program product of claim 11, wherein the first apparatus is further configured to:
   initiate presentation of one or more financial institution accounts associated with the user on the wearable device in response to receiving the authentication request;
   electronically receive, via the wearable device, a user selection of at least one of the one or more financial institution accounts; and
   establish a communicable link between the wearable device and the at least one financial institution account selected by the user, thereby enabling the user to execute transactions using funds associated with the financial institution account selected by the user.

13. The computer program product of claim 9, wherein the first apparatus is further configured to:
   electronically receive via a mobile device of the user, an authentication request from the user to associate the wearable device with the one or more financial institution accounts of the user, wherein the mobile device is communicably paired with the wearable device;
   electronically receive one or more authentication credentials from the user via the mobile device; and
   authenticate the wearable device based on at least verifying the authentication credentials received from the user.

14. The computer program product of claim 13, wherein the first apparatus is further configured to:
   initiate presentation of one or more financial institution accounts associated with the user on the mobile device of the user in response to receiving the authentication request;
   electronically receive, via the mobile device, a user selection of at least one of the one or more financial institution accounts; and
   establish a communicable link between the wearable device and the at least one financial institution account selected by the user, thereby enabling the user to execute transactions using funds associated with the financial institution account selected by the user.

15. The computer program product of claim 9, wherein the first apparatus is further configured to:
   continuously monitor the wearable device to determine whether the user continues to remain in possession of the wearable device, wherein monitoring further comprises continuously receiving input from the wearable device, the input comprising biometric feedback associated with the wearable device.

16. A computer implemented method for authenticating the use of a wearable device to execute a transaction, the method comprising:
   receiving an indication that a user is in possession of the wearable device, the wearable device being associated with a token, wherein the token comprises information associated with one or more financial institution accounts of the user;
   determining a default authentication level associated with the wearable device;
   requesting one or more authentication credentials associated with the default authentication level;
   authenticating the wearable device at a first time based on at least the receiving one or more authentication credentials associated with the default authentication level;
   electronically receiving an indication that the user is executing a transaction using the wearable device;
   determining that the transaction requires an authentication level higher than the default authentication level;
   determining one or more additional authentication credentials associated with the authentication level required to execute the transaction;
   requesting the one or more additional authentication credentials from the user;
   authenticating the wearable device based on at least receiving the one or more additional authentication credentials associated with the authentication level higher than the default authentication level at a second time;
   executing the transaction using at least one of the one or more financial institution accounts of the user associated with the token based on at least determining that the user has continued to remain in possession of the wearable device from the second time and that the user has been authenticated at a level higher than the default authentication level to execute the transaction;
   electronically receiving an indication that the user has not maintained possession of the wearable device for a predetermined period of time after the execution of the transaction; and
   reverting the authentication level of the user from the authentication level higher than the default authentication level to the default authentication level.

17. The computer implemented method of claim 16, wherein authenticating further comprises:
   electronically receive an indication that the user has scanned the wearable device at a point of sale of the merchant;
   retrieve the token associated with the wearable device based on at least receiving the indication that the user has scanned the wearable device at the point of sale of the merchant, wherein the token comprises user identification information; and
   complete execution of the transaction using at least one of the one or more financial institution accounts of the user associated with the token.

* * * * *